(12) United States Patent
Fuglsang et al.

(10) Patent No.: US 12,153,578 B2
(45) Date of Patent: *Nov. 26, 2024

(54) ADAPTIVE MODEL TRANSFORMATION IN MULTI-TENANT ENVIRONMENT

(71) Applicant: Express Scripts Strategic Development, Inc., St. Louis, MO (US)

(72) Inventors: Dennis Fuglsang, Ballwin, MO (US); Robert W. Scanlon, Des Peres, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,033

(22) Filed: Aug. 28, 2023

(65) Prior Publication Data

US 2023/0409576 A1  Dec. 21, 2023

Related U.S. Application Data

(63) Continuation of application No. 17/691,693, filed on Mar. 10, 2022, now Pat. No. 11,741,102.

(51) Int. Cl.
*G06F 16/00* (2019.01)
*G06F 16/22* (2019.01)
(Continued)

(52) U.S. Cl.
CPC .... *G06F 16/24547* (2019.01); *G06F 16/2272* (2019.01); *G06F 16/2448* (2019.01); *G06F 16/2456* (2019.01); *G06F 16/258* (2019.01)

(58) Field of Classification Search
None
See application file for complete search history.

(56) References Cited

U.S. PATENT DOCUMENTS 7,181,472 B2 *  2/2007  Cameron .............. G06F 16/275
                                                 707/758
7,734,745 B2     6/2010  Gloe
(Continued)

FOREIGN PATENT DOCUMENTS

CN           112288080 A  *  1/2021

OTHER PUBLICATIONS

A query language for biological networks, Ulf Leser, vol. 21 (Year: 2005).

*Primary Examiner* — Jean M Corrielus
(74) *Attorney, Agent, or Firm* — Miller Johnson

(57) ABSTRACT

A method includes receiving a query directed to a first data model that specifies base data fields. The method includes determining extension bindings for the first data model. A binding specifies an extension to the first data model and specifies one of the base data fields as a node at which the specified extension is added. The extension specifies a non-empty set of data fields. The method includes retrieving base data values according to the base data fields and extension data values according to, for a first binding, the set of data fields. The method includes generating a data object from the base and extension data values according to a second data model. The second data model is based on the first data model extended by adding the data fields from the extension specified by the first binding to the first data model at the specified node.

20 Claims, 15 Drawing Sheets

(51) Int. Cl.
*G06F 16/242* (2019.01)
*G06F 16/2453* (2019.01)
*G06F 16/2455* (2019.01)
*G06F 16/25* (2019.01)

(56) References Cited

U.S. PATENT DOCUMENTS

| | | | |
|---|---|---|---|
| 8,171,018 B2* | 5/2012 | Zane | G06F 16/2456 707/718 |
| 8,898,104 B2 | 11/2014 | Mandelstein | |
| 8,924,574 B2 | 12/2014 | Alex | |
| 9,448,823 B2 | 9/2016 | Bourges-Sevenier | |
| 9,619,552 B2 | 4/2017 | Falter | |
| 9,817,867 B2 | 11/2017 | Hsieh | |
| 9,898,545 B2 | 2/2018 | Idicula | |
| 10,049,141 B2 | 8/2018 | Prophete | |
| 10,176,893 B2* | 1/2019 | Sysko | G16Z 99/00 |
| 10,397,342 B2 | 8/2019 | Bruchlos | |
| 10,937,073 B2 | 3/2021 | Sharma | |
| 10,949,420 B2 | 3/2021 | Curtis | |
| 11,086,890 B1 | 8/2021 | Li | |
| 11,100,172 B2 | 8/2021 | Curtis | |
| 11,138,191 B1 | 10/2021 | De Boer | |
| 11,461,347 B1* | 10/2022 | Das | G06F 16/2433 |
| 11,907,902 B2* | 2/2024 | MacDonald | G16H 40/20 |
| 2005/0257051 A1* | 11/2005 | Richard | G06F 16/90 713/165 |
| 2008/0120607 A1 | 5/2008 | Dippel | |
| 2010/0145986 A1 | 6/2010 | Lim | |
| 2010/0313182 A1 | 12/2010 | Chen | |
| 2011/0099185 A1 | 4/2011 | Trevor | |
| 2012/0016880 A1 | 1/2012 | Abrahams | |
| 2012/0096426 A1 | 4/2012 | Sarafudinov | |
| 2013/0268545 A1* | 10/2013 | Burchett | G06F 16/986 707/754 |
| 2015/0074117 A1 | 3/2015 | Gorelik | |
| 2015/0154269 A1* | 6/2015 | Miller | G06F 16/2477 715/780 |
| 2017/0139887 A1 | 5/2017 | Miller | |
| 2017/0286038 A1* | 10/2017 | Li | G06F 9/547 |
| 2018/0039758 A1* | 2/2018 | MacDonald | G16H 40/63 |
| 2020/0012715 A1* | 1/2020 | Miller | G06F 40/174 |
| 2021/0043296 A1* | 2/2021 | Xavier | A61M 5/172 |
| 2021/0174009 A1* | 6/2021 | Miller | G06F 40/279 |

* cited by examiner

Model-Defined Data Object

```
{
"resourceId": "ba38f7a5-7757-4513-883c-1440e749772",
"medication": {
  "name": "paracetamol",
  "reference": {
    "value": "10",
    "version": "1.0",
    "type": "iDOC"
  }
},
"subject": {
  "resourceId": null,
},
"effectiveDateTime": "2019-04-30T12:30:40Z",
"performer": {
  "actor": {
    "resourceId": "b245ce30-ad99-4aa1-bbd8-c80d8d70689",
    "resourceType": "Practitioner"
  },
  "function": "Physician's Assistant"
},
...
}
```
400

Extend Model →

Extended-Model-Defined Data Object

```
{
"resourceId": "ba38f7a5-7757-4513-883c-1440e749772",
"medication": {
  "name": "paracetamol",
  "reference": {
    "value": "10",
    "version": "1.0",
    "type": "iDOC"
  },
  "isSpecialtyDrug": false,
  "genericName": "Tylenol"
},
"subject": {
  "resourceId": null,
  "patient": {
    "name": "Roger H. Daltrey",
    "birthDate": "1944-03-01"
  }
},
"effectiveDateTime": "2019-04-30T12:30:40Z",
"performer": {
  "actor": {
    "resourceId": "b245ce30-ad99-4aa1-bbd8-c80d8d70689",
    "resourceType": "Practitioner"
  },
  "function": "Physician's Assistant",
  "physician": {
    "name": "Roscoe K Arbuckel",
    "npi": "114530423"
  },
  ...
}
}
```
404

FIG. 4

ADAPTIVE MODEL TRANSFORMATION IN MULTI-TENANT ENVIRONMENT

CROSS-REFERENCE TO RELATED APPLICATIONS

This application is a continuation of U.S. patent application Ser. No. 17/691,693 filed Mar. 10, 2022, the entire disclosure of which is incorporated by reference.

FIELD

The present disclosure relates to data interchange using application programming interfaces (APIs) and more particularly to adaptive transformation of data models for API transfers.

BACKGROUND

In an enterprise, services may interact with many different types of data objects. For example, an application programming interface (API) may return a data object in response to a query. Different actors within the enterprise may require different variations on the data. For example, when requesting a patient data object, one actor may require a physical address, while another actor may require a health care-related field, such as the identity of the entity's primary care provider.

Enterprises may accommodate these divergent needs by incrementally adding all of the required fields to the data object such that the data object is a superset of all potentially needed fields. Then, an actor that does not require a field (such as the physical address) can simply ignore it. However, each time the data object format is changed, actors relying on that data object may have to update their code. This creates maintenance and scalability problems.

Another option is to create different APIs for all of the actors who need to access the object. Each API can return the fields relevant to that actor. But the maintenance and scalability problems for this approach are even more severe.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A query processing method includes receiving a query from a requestor. The query is directed to a first data model. The first data model specifies multiple base data fields. The method includes determining a set of extension bindings for the first data model based on the query. Each binding of the set of extension bindings (i) specifies an extension to the first data model from a set of model extensions and (ii) specifies one of the base data fields of the first data model as a node at which the extension is added. Each extension of the model extensions specifies a non-empty set of data fields. The method includes retrieving, from data storage, base data values according to the base data fields of the first data model and extension data values according to, for each binding of the set of extension bindings, the non-empty set of data fields from the specified extension. The method includes generating a data object from the base data values and the extension data values according to an extended data model. The extended data model is defined by the first data model extended by, for each binding of the set of extension bindings, adding the non-empty set of data fields from the specified extension to the first data model at the specified node. The method includes returning the data object to the requestor.

In other features, the set of extension bindings is determined based on an identity of the requestor. In other features, the set of extension bindings is determined based on a tenant the requestor is associated with. In other features, the query processing method includes storing multiple extension bindings. The extension bindings can be specific to a respective tenant of a set of tenants. In an example embodiment, each of the extension bindings is specific to a respective tenant of a set of tenants. The set of extension bindings is determined by identifying a tenant associated with the requestor and selecting, as the set of extension bindings, ones of the extension bindings that are specific to the identified tenant.

In other features, identifying the tenant associated with the requestor is based on security credentials of the requestor. In other features, the query processing method includes at least one of extracting an identifier of the tenant from the security credentials and looking up an identifier of the tenant based on, at least in part, the security credentials.

In other features, the query processing method includes storing multiple extension bindings. Each of the extension bindings is specific to a respective tenant of a set of tenants. The base data values are retrieved from a common data store accessible by multiple tenants. The extension data values are retrieved from a tenant-specific data store. In other features, the query processing method includes searching the tenant-specific data store, obtaining core record identifiers, and, subsequent to searching the tenant-specific data store, searching the common data store using the core record identifiers as join criteria.

In other features, the query processing method includes searching the common data store, obtaining record identifiers, and, subsequent to searching the common data store, searching the tenant-specific data store using the record identifiers as join criteria. In other features, the query processing method includes storing multiple extension bindings. The extension bindings can be specific to a respective tenant of a set of tenants. Each of the extension bindings is specific to a respective tenant of a set of tenants. The base data values are retrieved from a common data store. The extension data values are retrieved from the common data store.

In other features, the base data values are retrieved from a first record of the common data store. The extension data values are retrieved from the first record of the common data store. In other features, the base data values are retrieved from a first record of the common data store. The extension data values are retrieved from further records of the common data store. In other features, for each extension of the model extensions, the extension specifies a data type for each field of the non-empty set of data fields.

An object disassembly method includes receiving a data object from a first system and determining a first data model relevant to the data object. The first data model specifies multiple base data fields. The method includes determining a set of extension bindings for the first data model based on a tenant associated with the data object. Each binding of the set of extension bindings (i) specifies an extension to the first data model from a set of model extensions and (ii) specifies to which node of the first data model the extension is added. Each extension specifies a non-empty set of data fields. The method includes extracting extended data fields from the data object by, for each binding of the set of extension bindings, extracting data of the non-empty set of data fields from the specified extension to the first data model. The method includes returning the extended data fields to the first system. The method includes generating a base data object by omitting the non-empty set of data fields from the data object. The method includes returning the base data object to the first system. In other features, the object disassembly method includes generating an extension data object based on the extended data fields. The extended data fields are returned to the first system by transmitting the extension data object to the first system.

A non-transitory computer-readable medium includes instructions including receiving a query from a requestor. The query is directed to a first data model. The first data model specifies multiple base data fields. The instructions include determining a set of extension bindings for the first data model based on the query. Each binding of the set of extension bindings (i) specifies an extension to the first data model from a set of model extensions and (ii) specifies one of the base data fields of the first data model as a node at which the extension is added. Each extension of the model extensions specifies a non-empty set of data fields. The instructions include retrieving, from data storage, base data values according to the base data fields of the first data model and extension data values according to, for each binding of the set of extension bindings, the non-empty set of data fields from the specified extension. The instructions include generating a data object from the base data values and the extension data values according to an extended data model. The extended data model is defined by the first data model extended by, for each binding of the set of extension bindings, adding the non-empty set of data fields from the specified extension to the first data model at the specified node. The instructions include returning the data object to the requestor.

In other features, the set of extension bindings is determined based on an identity of the requestor. In other features, the instructions further include storing multiple extension bindings. The extension bindings can be specific to a respective tenant of a set of tenants. Each of the extension bindings is specific to a respective tenant of a set of tenants. The set of extension bindings is determined by identifying a tenant associated with the requestor and selecting, as the set of extension bindings, ones of the extension bindings that are specific to the identified tenant. In other features, identifying the tenant associated with the requestor is performed based on security credentials of the requestor. In other features, the instructions further include storing multiple extension bindings. Each of the extension bindings is specific to a respective tenant of a set of tenants. The base data values are retrieved from a common data store accessible by multiple tenants. The extension data values are retrieved from a tenant-specific data store.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4 is a graphical representation of a simplified example of base and extended data objects according to the principles of the present disclosure.

In the drawings, reference numbers may be reused to identify similar and/or identical elements.

DETAILED DESCRIPTION

High-Volume Pharmacy

Figure 1:
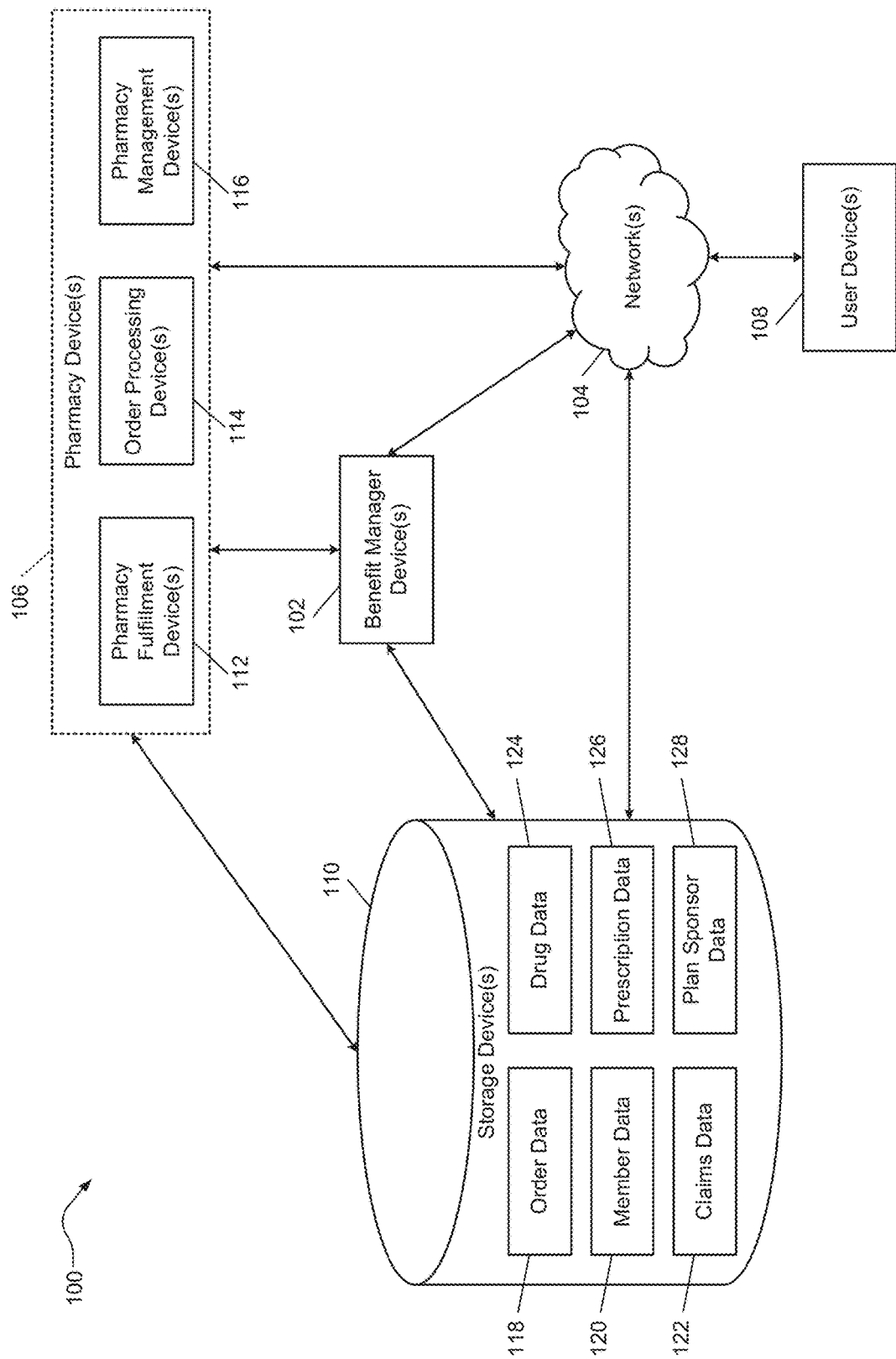
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

While various embodiments are described in relationship to pharmacy data, the embodiments of the present disclosure may not be so limited. The storage device 110 may store different types of data, e.g., sales data, insurance data, security data, production data, order fulfillment, and the like. The enterprise devices 102, 112, 114, 116 and user devices 108 may access the data. However, when enterprises (like system 100) are scaled the quantity of specialized data requests may grow exponentially. Electronic services may interact with many different types of data objects. For example, an application programming interface (API) may return a data object in response to a query. Different actors within the enterprise may require different variations on the data from the storage device. For example, when requesting a data object, one device may require a physical address, while another device may require an insurance-related field, such as the identity of the entity's primary insurance provider. Enterprises may accommodate these divergent needs by incrementally adding all of the required fields to the data object such that the data object is a superset of all potentially needed fields. Then, a user that does not require a field (such as the physical address) can simply ignore it. However, each time the data object format is changed, actors relying on that data object may have to update their code, e.g., engage a specialized programmer to edit or rewrite code, e.g., the entire API. As identified by the present inventors, this creates maintenance and scalability problems.

Figure 2:
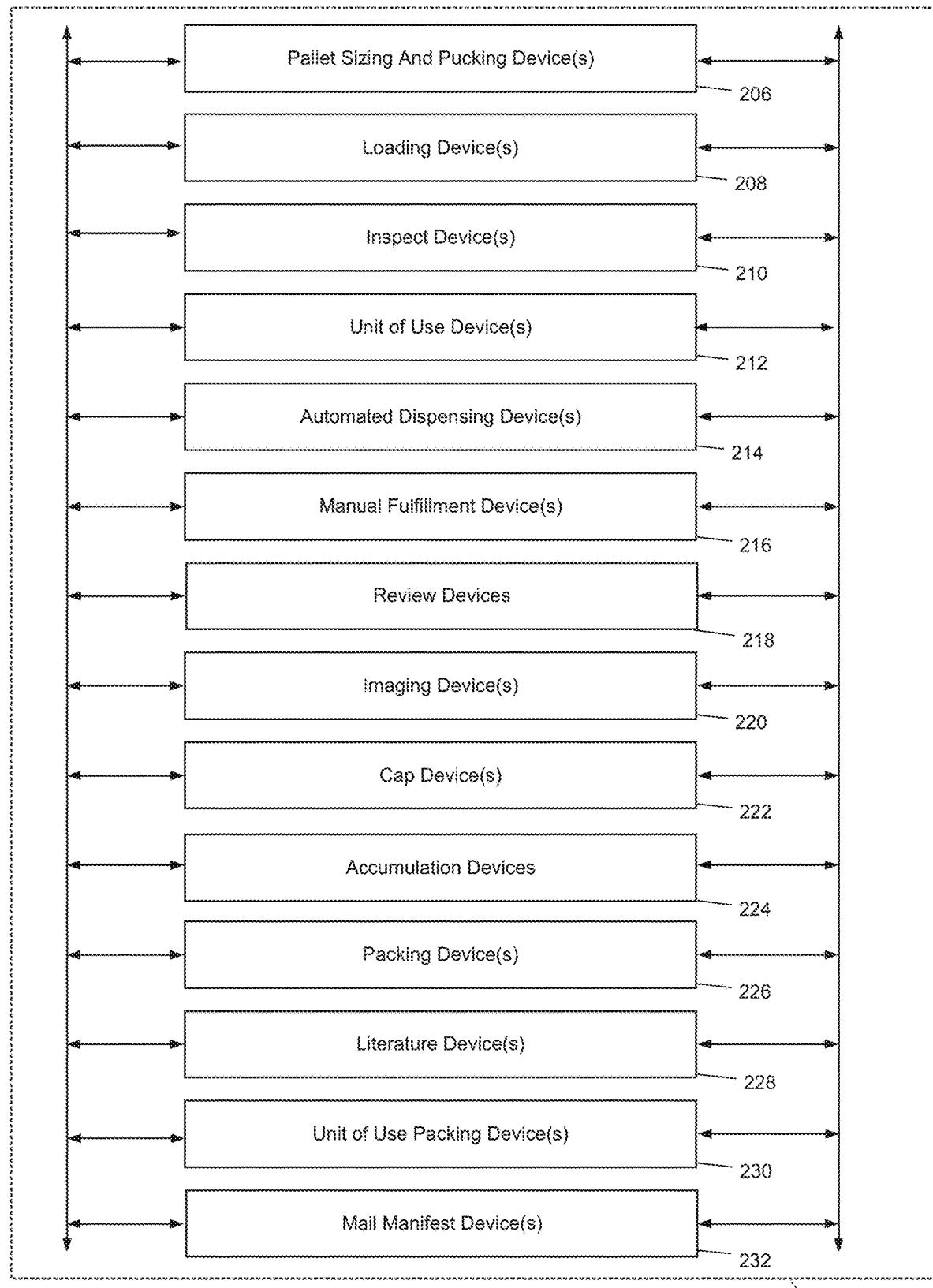
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s)

214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Each of the order fulfillment devices described in relation to FIG. 2 may output a data type that can be stored in the storage device 110, e.g., pallet and puck data, loading data, inspect data, unit of use data, automated dispense data, manual dispense data, dispense review data, image data, capping data, accumulation data, packing data, literature data, mail manifest data, and the like. A query processing method includes receiving a query from a requestor for at least one of these data types. The query is directed to a first data model. The first fulfillment data model specifies multiple base data fields. The method includes determining a set of extension bindings for the first fulfillment data model based on the query. Each binding of the set of extension bindings (i) specifies an extension to the first fulfillment data model from a set of model extensions and (ii) specifies one of the base data fields of the first fulfillment data model as a node at which the extension is added. Each extension of the model extensions specifies a non-empty set of data fields. The method includes retrieving, from data storage, base data values according to the base data fields of the first fulfillment data model and extension data values according to, for each binding of the set of extension bindings, the non-empty set of data fields from the specified extension. The method includes generating a data object from the base data values and the extension data values according to an extended fulfillment data model. The fulfillment extended data model is defined by the first fulfillment data model extended by, for each binding of the set of extension bindings, adding the non-empty set of data fields from the specified extension to the first fulfillment data model at the specified node. The method includes returning the data object to the requestor device.

Figure 3:
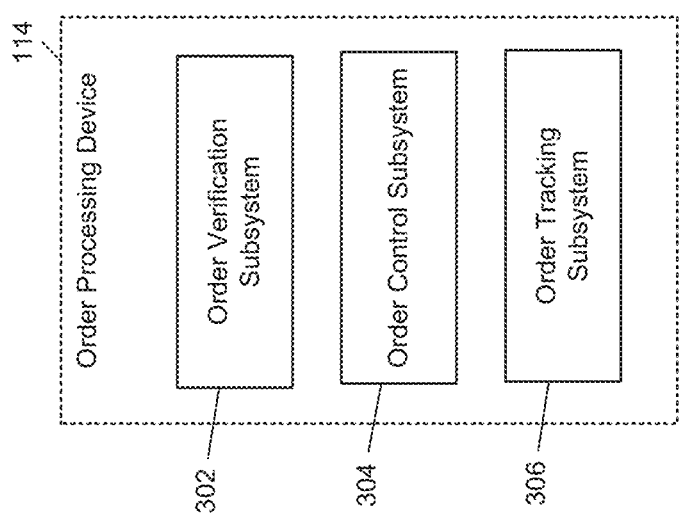
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

The subsystems 302, 304, or 306 described with relation to FIG. 3 may generate data that is accessed according to the present disclosure or may request data, e.g., work with a first data model, a first extension model, further extension models, or combinations thereof.

API Introduction

The present disclosure describes a model-defined approach to data objects and to application programming interfaces (APIs) that rely on those data objects. In various implementations, the APIs may possess some or all of the architectural attributes of a representational state transfer (REST) architecture. The format of a data object may be defined rigorously using a domain model. Rigorously defining a data model allows for the data model definition to be easily shareable, easily documented, and tracked just like code in version control systems.

This model may have an internal representation that is similar to, the same as, or based on a JavaScript object notation (JSON) schema, a GraphQL schema, a Swagger model definition, a unified modeling language (UML) definition, etc. The internal representation captures structures, properties, relationships, data types, required fields, editable fields, and value constraints. The internal representation may be stored as a file: for example, serialized as an XML file, JSON file, a Yet Another Markup Language (YAML) file, a comma separated value (CSV), etc. Further, in various implementations the model may be deserialized from one of these files. In an example embodiment, the serialization of the data types can be fed into the present processes and systems to a single internal core language of the core models, e.g., a structure with entities with attributes and the attribute values. The core models can be processed uniformly. Once the core models are processed then resulting extensions can be sent to any of the serialization formats.

A base object model may be defined for all tenants, while specific extensions to that data model may be defined per tenant. Tenants simply refer to different groups that may use data objects described by the data model. For example, the tenants may refer to groups within an organization or to groups across multiple organizations. For example, in the context of a pharmacy benefit manager (PBM), one tenant may be a team responsible for specialty drug reimbursement while another tenant may be a team responsible for non-specialty drug reimbursement. In another PBM example, one tenant may be the team responsible for specialty drug reimbursement while another tenant may be a team at a health insurance provider responsible for specialty drug coverage. Because each tenant may require different fields, an extension to the base model may be defined for each tenant. An API will use, for each tenant, the data object with the relevant additional fields. The tenants may also refer to electronic devices used by the group with the organization, which have permission to access data.

To see how this is accomplished, refer to FIG. 4 for a simplistic example. In this example, an example data object 400 for a medication is shown. The data object 400 includes a resourceId field, a medication field, a subject field, an effectiveDateTime field, and a performer field. Other fields may be used. An ellipsis indicates that additional fields in the data object 400 are excluded simply for ease of illustration. These fields may also be referred to as nodes, since the hierarchy of fields can be thought of as a tree structure.

Beneath the medication node is a name node and a reference node. In this specific example, the value for the name field is "paracetamol." The reference node includes three subnodes for value, version, and type. The subject node has one subnode, resourceid, which in this specific data object example, has a value of null. The performer node has two subnodes: actor and function.

The data object 400 is based on a common data model. For a particular tenant, additional fields may be helpful. An extended data object 404 includes all of the fields of the data object 400 as well as additional fields, referred to as extension fields. Underneath the medication node are two additional nodes: isSpecialty drug (having a value of false in this example) and genericName (having a value of "Tylenol" in this example).

In the extended data object 404, a patient subnode is added underneath the subject node of the data object 400.

The patient node includes two fields, name and birthDate. Further, the performer node is extended by adding a physician node. The physician node has two fields: name and national provider identifier (NPI). Considering the extended data object 404 as a record describing a prescription, the actor node may identify the prescribing practitioner, while the physician field may refer to the patient's physician or the physician under whose supervision the physician's assistant is practicing.

The extended data object 404 in this example may be applicable to a tenant having the need for identifying the name and birthdate of a patient, additional information about the medication, and the identity of the physician associated with the record.

Figure 5:
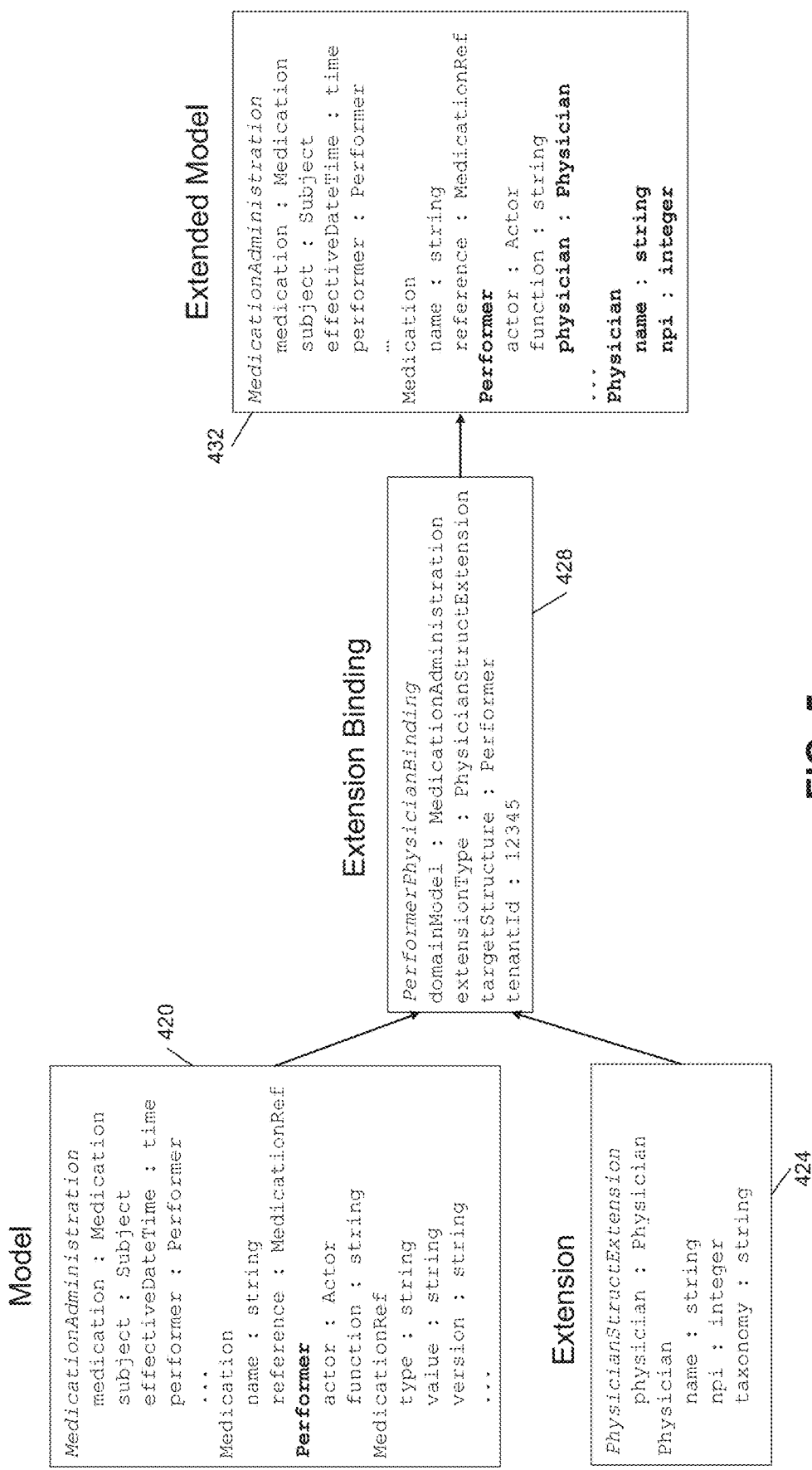
FIG. 5 is a graphical illustration of a simplified example of extending a data model according to the principles of the present disclosure.

FIG. 5 graphically depicts how the physician subnode is added to the performer node according to the present disclosure. A model 420 defines the data object 400. An extension 424 defines a model extension specifying a physician node. The physician node is of type physician, which in this example is a structure having two fields: name and NPI. The name is of type string and the NPI is of type integer. Note that the extension 424 exists separately from the model 420 and may therefore be used to extend a variety of models, not just the model 420.

An extension binding 428 identifies how to bind, in this example, the extension 424 to the model 420. Specifically, the extension binding 428 identifies the domain model, identifies the extension, and identifies which node of the model should be extended by the extension. Further, the extension binding 428 specifies the tenant for which this extension binding is relevant. In various implementations, each extension binding is specific to a tenant, while the extensions may be used by any number of tenants. These implementations are consistent with a framework where each tenant is an independent, isolated, consumer of a service that is unaware of the other tenants or what extensions the other tenants are applying to the core model. The service may include device that connect through a communication connection. However, in other implementations, a single extension binding may be used by multiple tenants that each need to extend the model in the same way. For simplicity of explanation, extension bindings (including the extension binding 428) are shown as being specific to a single tenant, with a single tenantId field.

An extended model 432 results from extending the model 420 by the extension 424 according to the extension binding 428. Note that the physician node is placed underneath the Performer node of the model 420, as specified by the extension binding 428. In FIG. 5, the extended aspects of the extended model 432 are emphasized with bold type. Further, simply for illustration, the Performer node of the model 420, which is extended by the extension binding 428, is also represented in bold.

By extending a data model dynamically, multi-tenant platforms are able to handle tenant-specific data needs. Models can be extended without having to refactor existing code. Tenants can define extension types for one or more models. In various implementations, tenants may access a set of shared extension types, such as from a digital catalog. Tenants can then control the binding of these extensions to specific models and, particularly, to specific nodes within the models. In some examples, extensions can be reused by multiple tenants. In an example embodiment, the actual extension bindings are accessible, and hence known, to the single tenant and may not be accessible to other tenants. In an example embodiment, the bindings are tenant specific configuration of extensions.

For a multi-tenant environment, extensions are dynamically attached based on binding information for the relevant tenant. Having tenant-specific extension fields is even more beneficial when some data only exists for that tenant. Defining fields in a common model for which only some tenants have data is inefficient and confusing to other tenants. Model extensions according to the principles of the present disclosure allow tenants to extend models for data that only those tenants possess. In an example, the multi-tenant environment may have a single database within a storage device that is accessible by a plurality of different tenants. For example, a same data type or same model may be used by different tenants.

Using defined models may help create a "model-first" software development pattern, where behavior is driven from models, rather than models being inferred from code. This pattern allows the use of tools that operate on declarative models, such as validators, linters, automated test case generators, etc. This approach makes initial development more straightforward, even as the model changes frequently. Model extension according to the present disclosure is independent of implementation choices, such as programming language (such as Java, Kotlin, or Python) or tool set, such as continuous integration and continuous development (CI/CD) toolchains.

In various implementations, the model extensions are loosely typed, which allows for driving software development based on models and allows for schema-based data validation for core models and extensions. This approach provides flexibility to rapidly prototype new models, since no specific objects such as a Plain Old Java Object (POJO) or data transfer object (DTO)—is needed to define the model. A model definition can initially be generated from a Swagger definition, a GraphQL definition, a JSON schema, a POJO, a CSV, etc. This may also be referred to as deserializing. Each of those source formats can also be the target of a model definition such that a new object can be created based on the model definition. In various implementations, this approach is standards-based, such as standardizing on JSON with GraphQL and JSON Schema factored in. This may allow for easy onboarding of new developers, overall simplicity, and the leveraging of existing libraries to manipulate and validate models.

Creating a dynamically extended model may not be intuitive for developers used to static definitions of data objects. However, the process inefficiency and additional storage space required by modular model extensions is more than offset by the benefits, such as some or all of those described above. Further, the processes for extending objects and handling extended objects have been optimized for efficiency. Examples of this efficiency are seen in the description below. In various implementations, in a case where no extensions are defined for a model for a particular tenant, no further processing is needed for servicing an API call for that tenant once the absence of extensions is identified at runtime.

Block Diagram

Figure 6:
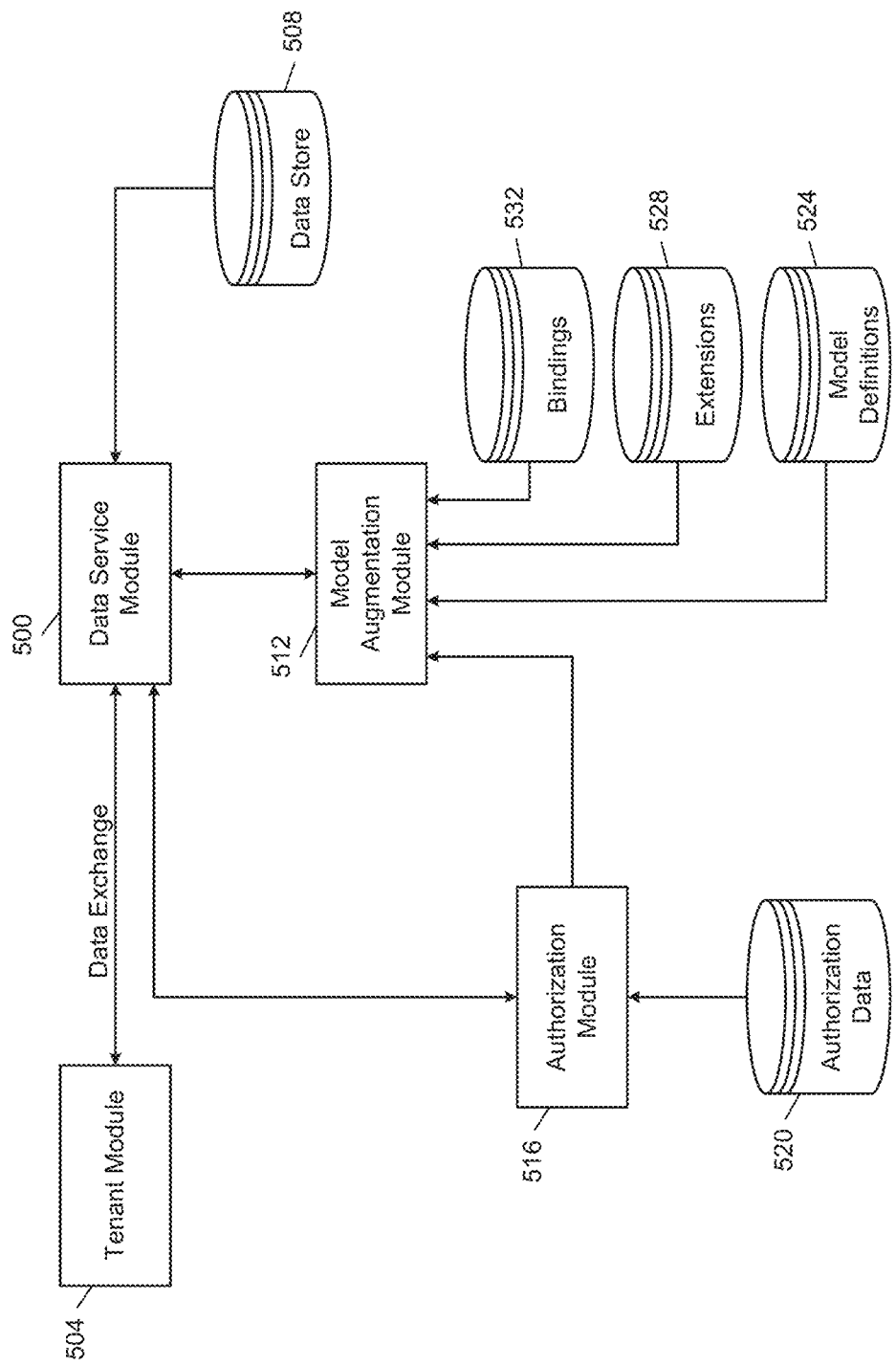
FIG. 6 is a functional block diagram of an example implementation of the present disclosure.

FIG. 6 is a functional block diagram of a simplified implementation of an example API-based service. In various implementations, the service may also be referred to as a micro-service. A data service module 500 handles requests for data from a tenant module 504. For example, these data requests may include a read request (also referred to as a query) or a write request (also referred to as an update).

The data service module 500 accesses a data store 508 to perform the relevant data operations. As described in more detail below, a variety of implementations of the data store 508 can be implemented, so the data store 508 is not limited to being a unitary system, such as a single relational database.

In response to a request from the tenant module 504, the data service module 500 may access a model augmentation module 512 to determine whether an extended (or, augmented) model is relevant to that tenant. In various implementations, the model augmentation module 512 may be a library that is linked to (or referenced by, included in, etc.) the data service module 500.

In various implementations, access to data may be controlled by an authorization module 516. In various implementations, the data service module 500 may only allow data to be provided to the tenant module 504 if the correct credentials are provided to the authorization module 516. The authorization module 516 may rely on authorization data 520, such as a credential store. In various implementations, the authorization module 516 may provide a token to the tenant module 504 that authorizes access to certain data by the tenant module 504. The authorization module 516 also identifies on which tenant's behalf the tenant module 504 is operated. This information about the relevant tenant is provided to the model augmentation module 512.

The model augmentation module 512 has access to a set of model definitions 524 as well as extensions 528 and bindings 532. The model definitions 524 may be common across all tenants in various implementations. The extensions 528 may be available to all tenants or may be restricted in some way. For example, in various implementations, some extensions may be read-only to certain tenants, allowing those tenants to copy extensions for re-use but not to use them directly. In various implementations, an extension catalog may be available to some or all tenants. In various implementations, each creator of an extension can mark whether that extension is public or not—extensions marked as public may be, for example, added to an extension catalog. In an example embodiment, all extension models can be in the catalog as well as bindings. The catalog and model extension processes can restrict access to models based on tenancy and attributes such as whether an extension model is shareable or not. The data structure can include a flag that identifies an extension model as shareable to other tenants or not.

The bindings 532 may be tenant-specific. In an example embodiment, the bindings are tenant specific. For example, each tenant may be able to create, modify, and delete bindings that, for that specific tenant, extend various models from the model definitions 524 using extensions 528. Each extension of the extensions 528 may specify a single set of nodes (which may each include one or more subnodes). That set of nodes will all be nested underneath a single node in the model. In other implementations, an extension may have multiple parts, with each part able to extend a different node of the model.

Each binding of the bindings 532 may specify a single extension and identify where exactly within a specific specified model that extension will be located. In an example, each binding of the bindings 532 specifies a single extension and identifies where exactly within a specific specified model that extension will be located. In other implementations, a binding may have multiple sections, each specifying where a respective portion of an extension is added to a model. Similarly, a binding may specify multiple extensions and specify where each extension is added to a model. Limiting bindings such that each can only refer to a single extension may enhance simplicity and reusability.

The data service module 500 may have been programmed prior to becoming extension-aware. In order to become extension-aware and take advantage of extension by the model augmentation module 512, the data service module 500 can be supplemented with a minimal amount of additional code. For example, the data service module 500 may need to import (or, invoke, include, link, reference, etc.) a library that enables model extension. In an example where the data service module 500 uses a class, such as a Java class, there may be a block of code that executes one time at startup for initialization. For example only, the code may be as simple as the following:

extensionService=new DefaultExtensionService( )
persistenceService=new DefaultPersistenceService( )
extensionService.initExtensionComponents(MedAdmin-AugmentationConfiguration( ))

The code for creation of an object may remain unchanged but is simply supplemented. For example only, the code may read extension values, save the extension values, and supplement an existing data object with the extension values. Then the extended data object can be returned as a JSON using another method. In the following example code, the existing data object is named "medAdminDto" and the extended data object is the return value of the toJsonResponse( ) method.

extensionValues=extensionService.readExtensionValues (request, tenantId)
persistenceService.sayeExtensionValues(extensionValues)
return extensionService.merge(medAdminDto,extensionValues).valueAsJson( )

For a method (or, function, routine, call, procedure, etc.) that receives and processes an extended data object, additional code at the beginning of the method may split out the extension values from the pre-existing object so that the pre-existing code can process the pre-existing object as had been done previously. Then, new code can be added to process the extension values. Finally, a library call can merge the processed extension values with the processed common data object to create an extended data object.

Charts

Figure 7:
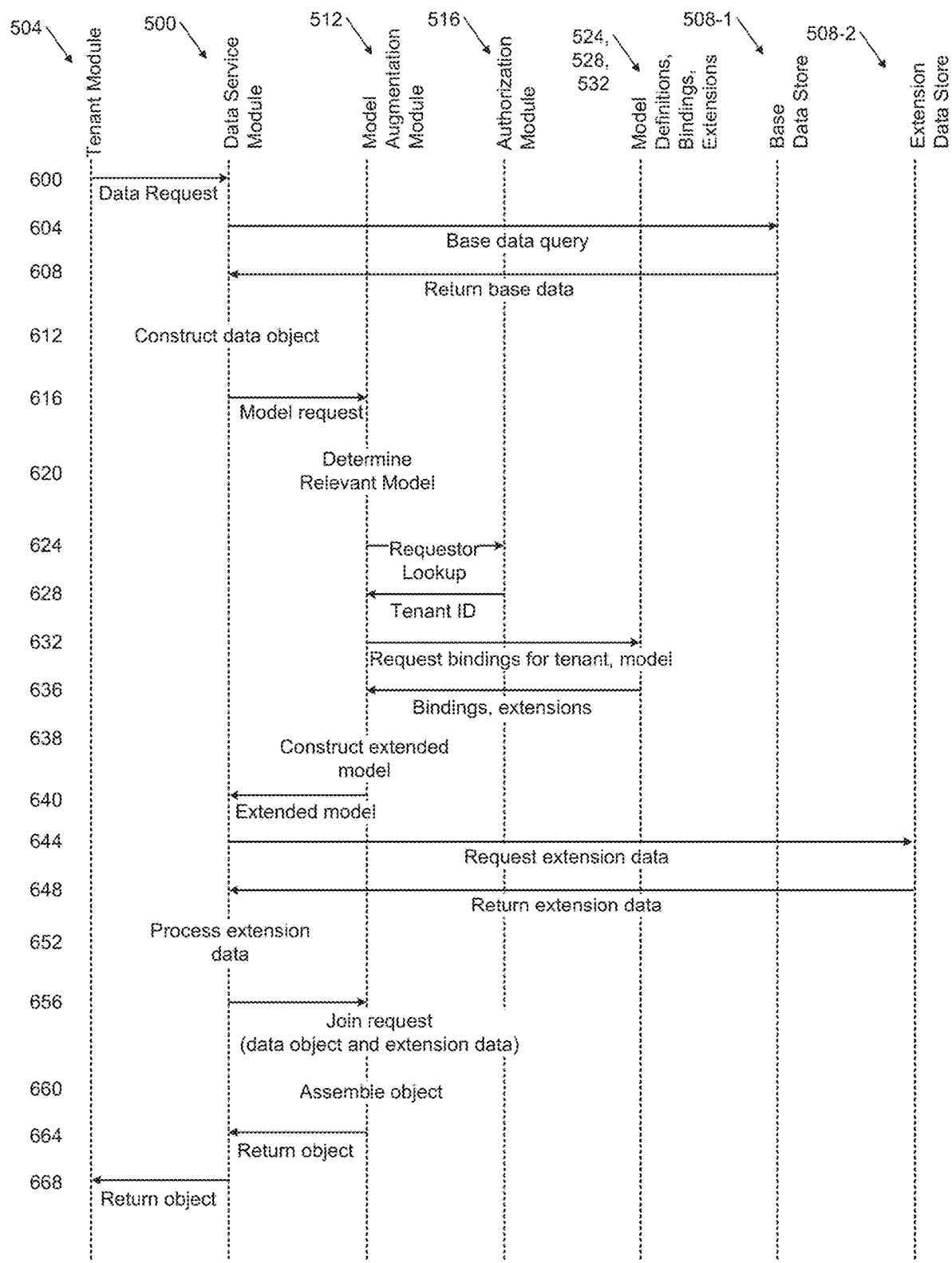
FIG. 7 is a message sequence chart for an example query process.

FIG. 7 is an example of how a query might be performed. At 600, the tenant module 504 makes a data request to the data service module 500. As an example only, the data store 508 of FIG. 6 is shown in FIG. 7 as two data stores, a base data store 508-1 storing values for fields within the non-extended common model and an extension data store 508-2-storing values for extension fields.

At 604, the data service module 500 makes a query for base data (that is, fields specified by the common model) to a base data store 508-1. At 608, the base data store 508-1 returns the requested data and, at 612, the data service module 500 constructs a data object based on the returned data. Constructing the data object may include performing processing on the field values.

At 616, the data service module 500 makes a model request to the model augmentation module 512. At 620, the model augmentation module 512 determines the relevant model for the data request from 600. In various implementations, only a single model will be relevant to the data service module 500, in which case 620 is redundant.

At 624, the model augmentation module 512 transmits a lookup request to the authorization module 516. At 628, the authorization module 516 responds to the model augmentation module 512 with a tenant ID. At 632, the model augmentation module 512 requests extension bindings for the specific tenant and relevant model. These bindings, and corresponding extensions, are obtained from the model definitions 524, the extensions 528, and the bindings 532.

At 636, the bindings and corresponding extensions are received by the model augmentation module 512. At 638, the model augmentation module 512 constructs an extended model by inserting, for each applicable extension of the extension bindings 532, the corresponding extension of the extensions 528 at the target of the core model specified by the extension. After first being constructed, this extended model may be cached for subsequent use. In other words, the extended model can be constructed for a first request and then re-used for subsequent requests.

In various implementations, the cache may be cleared at certain events, such as restarting of the model augmentation module 512 or the data service module 500. In various implementations, a cached model may be valid for a certain period of time, such as 60 seconds, 1 hour, or 24 hours—after which the cached model is marked as suspect or invalid. Then, either the cached model is re-validated or the extended model is reconstructed and cached again. At 640, the model augmentation module 512 provides the extended model, including information about the extension fields, to the data service module 500.

At 644, in the case that there are relevant extension fields, the data service module 500 requests data for these extension fields from the extension data store 508-2. At 648, the extension data store 508-2 returns that extension data, which is processed by the data service module 500 at 652. At 656, the data service module 500 makes a join request to the model augmentation module 512 to combine the common data object with the extension data. At 660, the model augmentation module 512 assembles the object and at 664, returns the object to the data service module 500. At 668, the data service module 500 returns the object to the tenant module 504.

Figure 8:
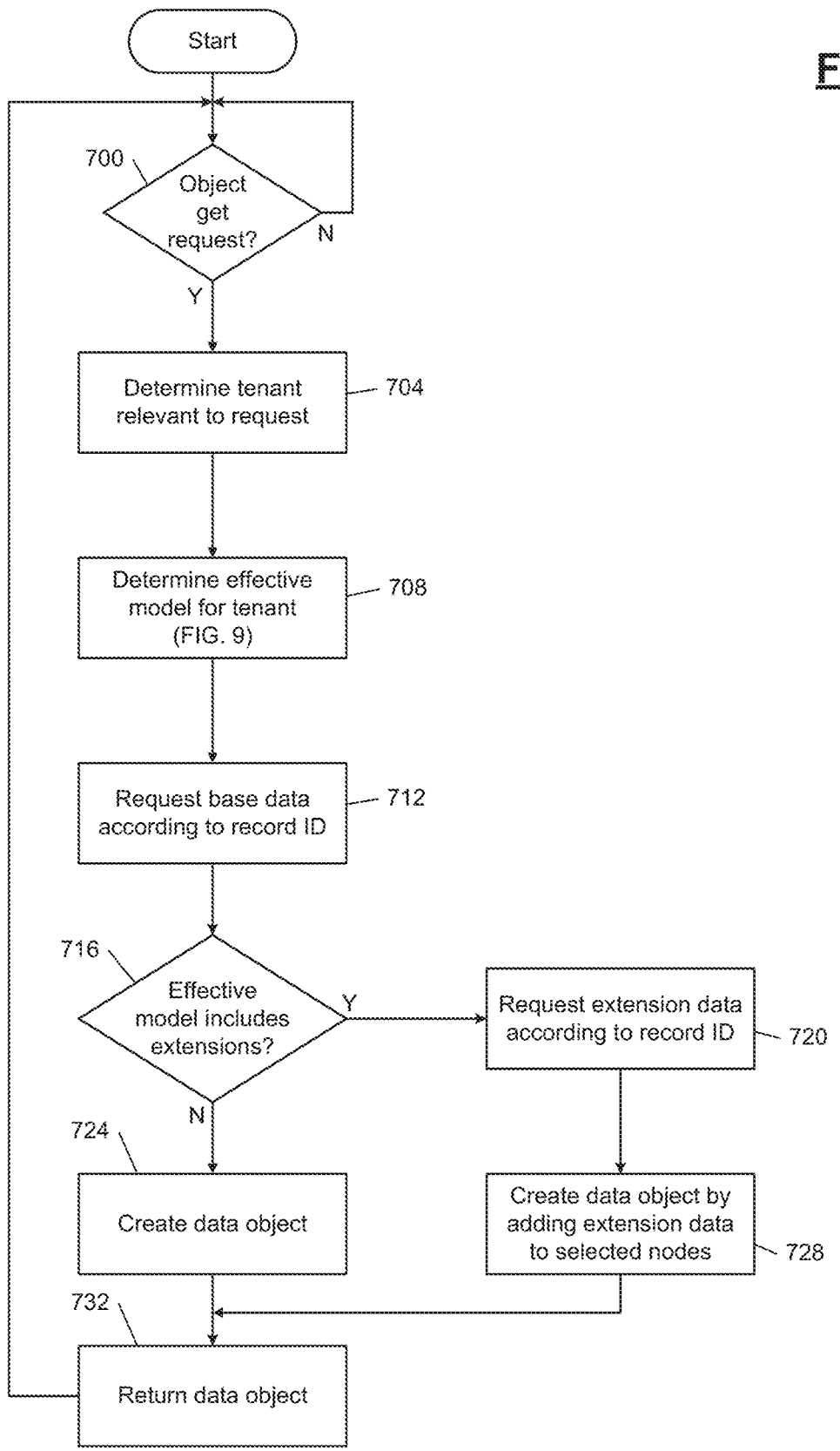
FIG. 8 is a flowchart of an example process for creating an extended data object.

FIG. 8 depicts example operation of creating an extended data object, including any relevant extension fields. Control begins at 700 where, if there is an object get request (such as a GET request to a RESTful API), control transfers to 704; otherwise, control remains at 700. At 704, control determines a tenant relevant to the request. For example, this may be based on a tenant ID of the tenant accessing the API.

At 708, control determines an effective model for the tenant. As an example, the process shown in FIG. 9 may be used to determine the effective model. At 712, control retrieves the base data for the effective model. For example only, the base data may be retrieved based on a record identifier (ID) specified in the request.

At 716, if the effective model includes extensions, control transfers to 720; otherwise, control transfers to 724. At 720, control requests extension data —for example, based on the record ID. Control continues at 728, where control creates an extended data object by adding the extension data to the extension fields of the data object. Control continues at 732, where the constructed data object is returned to the requestor. Control then returns to 700. In various implementations, the data object may be returned in two parts: first, a base data object with only base data, lacking any extensions, and second, an extension object including only the extension data. In this way, the base data object can be used by existing code with no serious modifications, while the extension object is used by additional code that is aware of the extension(s).

At 724, control creates a data object without any extensions based on the data requested at 712. Control then continues at 732, where the data object is returned.

Figure 9:
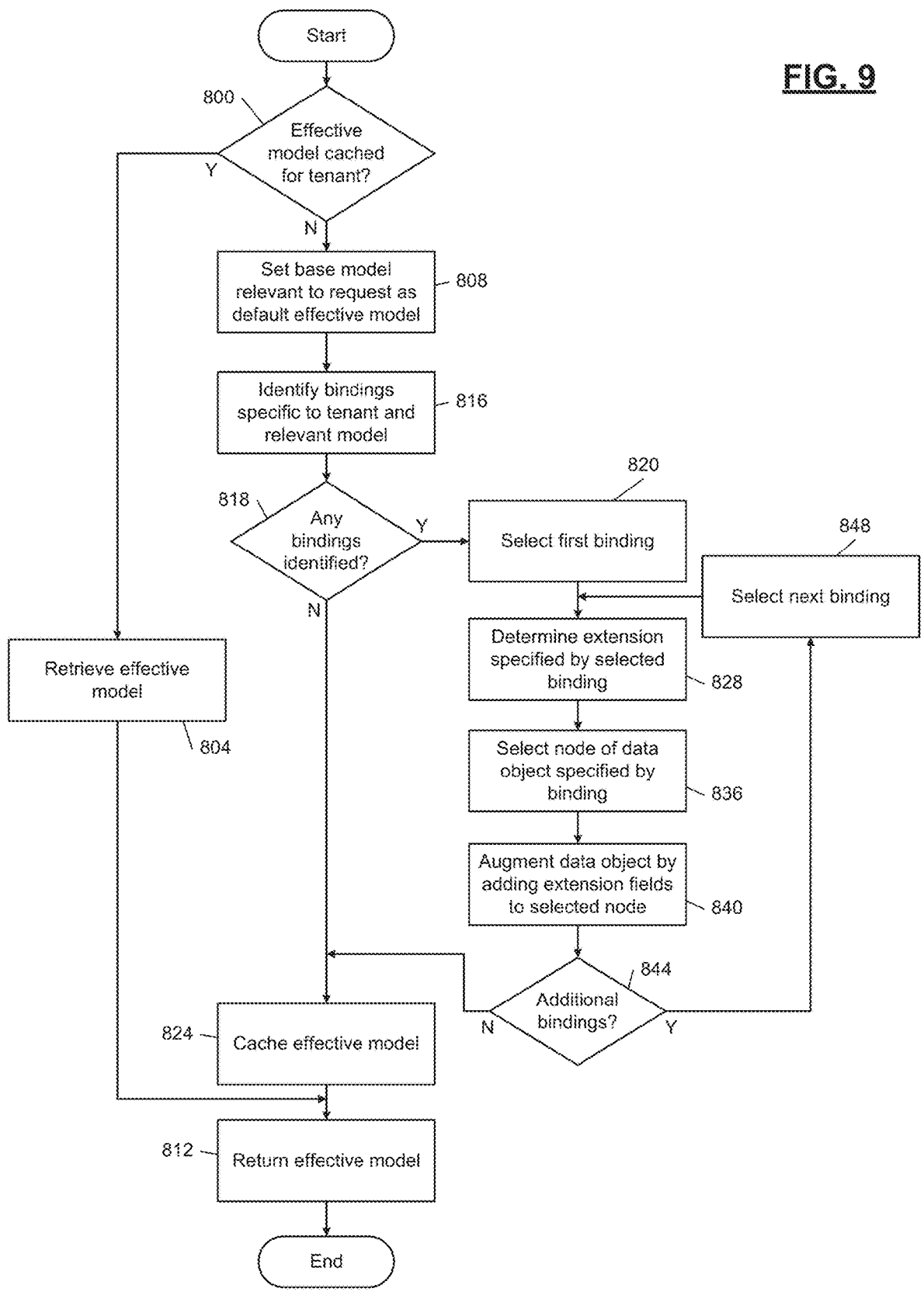
FIG. 9 is a flowchart of an example process for constructing an extended data model.

In FIG. 9, example operation to determine an effective data model begins at 800. The term "effective data model" means a data model that is extended (or not) based on whether there are any bindings defined for the tenant. In other words, for some tenants the effective data model may be the same as the base data model while for other tenants the effective data model may be extended by the respective extensions according to the bindings. The applicable base data model may be determined simply by which service is requesting the effective data model —in various implementations, a service may be specific to a single data model.

At 800, control determines whether the effective model is already known for the specified tenant. For example, the effective model may have been determined previously and cached. If the effective model is already known and remains valid, control transfers to 804; otherwise, control transfers to 808. For example, the effective model may have been determined more than a specified period in the past, and may therefore not be considered reliable. The specified period may be defined to ensure that changes to bindings and extensions are identified and used in creating updated versions of the effective model. At 804, control retrieves the effective model and continues at 812. At 812, control returns the effective model and ends. In various other implementations, the effective model is never cached and therefore is constructed anew each time a request is received.

At 808, control initializes the effective model to be the same as the base data model. At 816, control determines whether there are any bindings for this tenant. At 818, if any bindings were identified, control transfers to 820; otherwise, control transfers to 824. At 820, control selects the first binding relevant to this tenant. In the case where there is only one binding, that binding is always the first binding. At 828, control determines which extension is specified by the selected binding. At 836, control selects the node of the data object specified by the binding. At 840, control augments the data object by adding the fields of the determined extension to the selected node. At 844, control determines whether there are additional bindings. If so, control transfers to 848; otherwise, control transfers to 824. At 848, control selects the next binding and continues at 828.

Figure 10:
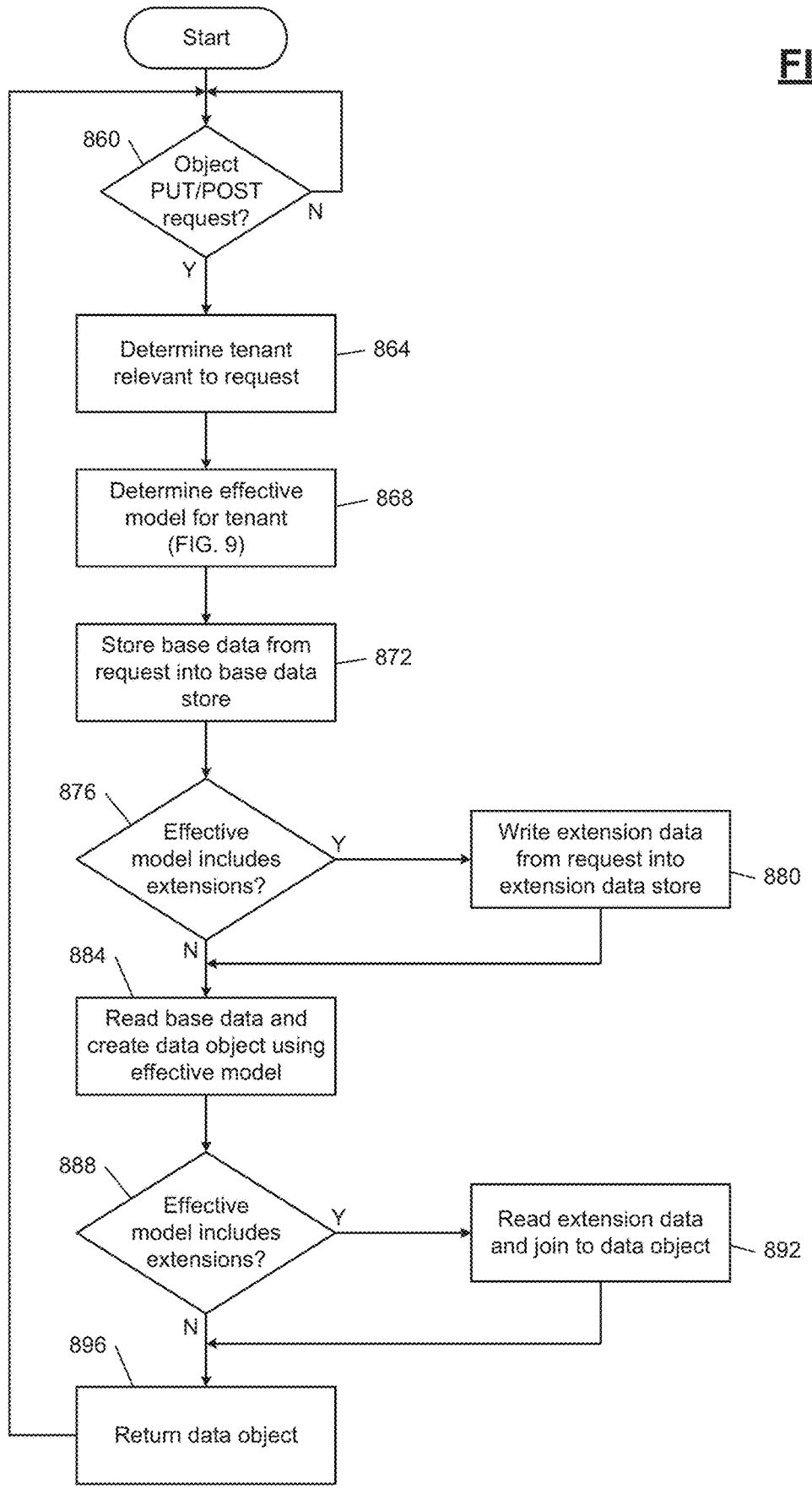
FIG. 10 is a flowchart of an example process for updating an extended data object.

FIG. 10 shows example operation of writing a data object, which may be extended according to the principles of the present disclosure. Control begins at 860 where, if an object write request (such as a PUT or POST request) is received, control continues at 864; otherwise, control remains at 860. At 864, control determines the tenant relevant to the request. For example, a tenant ID may be contained in or referenced by the request. At 868, control determines the effective model for this tenant, such as by using the approach shown in FIG. 9.

At 872, control stores base data from the request into a base data store for the model. For example, the request may include or reference an object storing the base data, either together with or separate from an object storing any extension data. At 876, if the effective model includes extensions, control transfers to 880; otherwise, control transfers to 884. At 880, control writes extension data from the request into an extension data store for the model. Control then continues at 884.

At 884, control retrieves base data from the base data store and creates a data object using the effective model populated with the retrieved base data. At 888, if the effective model includes extensions, control transfers to 892; otherwise, control transfers to 896. At 892, control retrieves extension data from the extension data store and joins the extension data with the base data in the data object. Control then continues at 896. At 896, control returns the data object to the requestor—for example, the service invoking FIG. 10. Control then returns to 860.

Functional Blocks

Figure 11A:
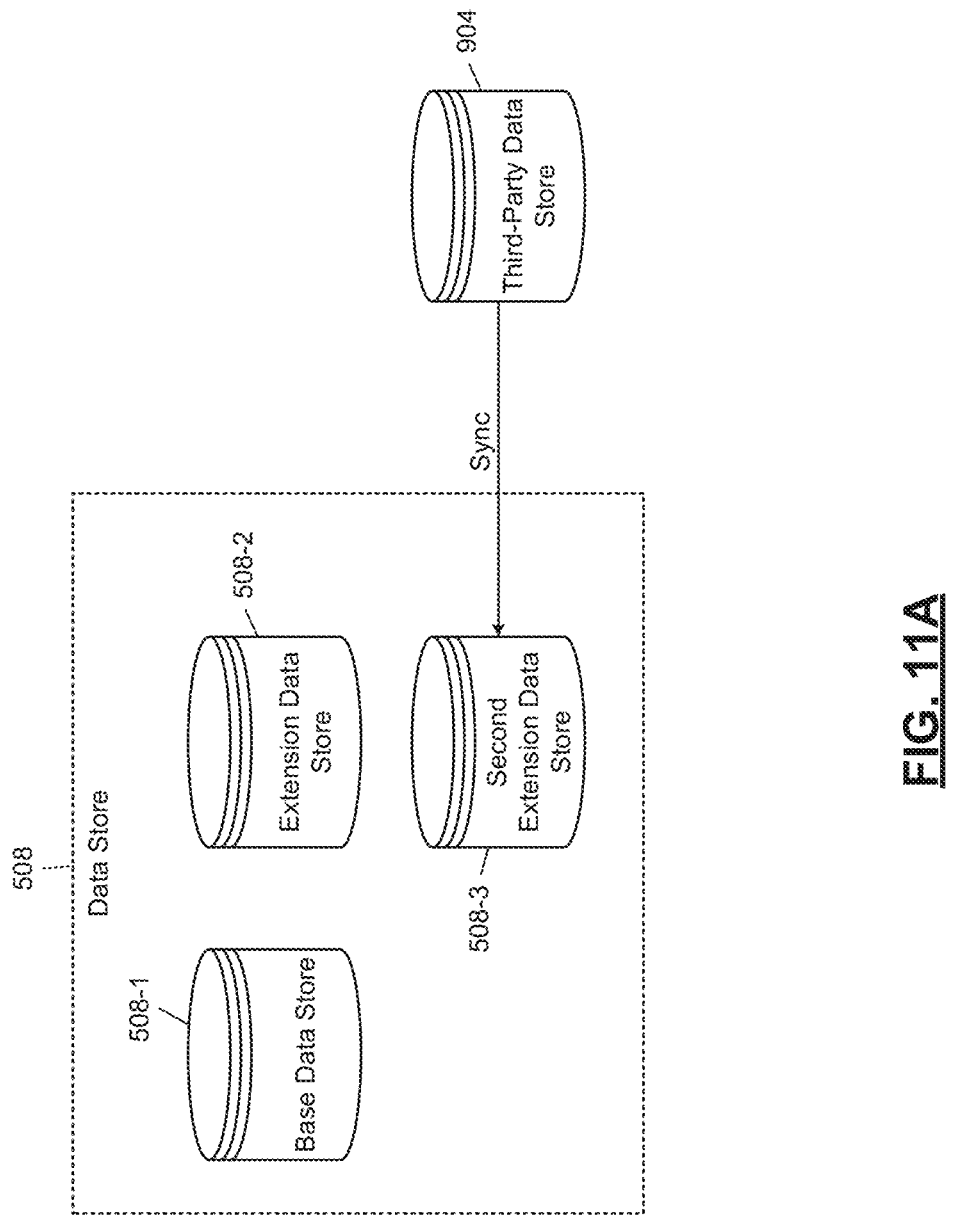
FIG. 11A is a simplified graphical representation of base and extension fields split among different data sources.

In FIG. 11A, a simplistic example of the data store 508 depicts that the data store 508 actually includes multiple data stores, 508-1, 508-2, and 508-3. The base data store 508-1 may include data for all of the fields of the base (or, common) data model. The extension data store 508-2 may include data for one or more extension fields for the model. The second extension data store 508-3 may include more data for the same extension fields or data for different extension fields.

In various implementations, the second extension data store 508-3 may be specific to a certain tenant and include data only relevant to that tenant. That data may simply be held by the data store 508 with no processing and simply supplied back to the tenant upon request. In various implementations, data in the second extension data store 508-3 may be synced from a third-party data store 904. For example, the second extension data store 508-3 may store extension fields that are relevant to a certain tenant and the third-party data store 904 may be under control of that certain tenant.

Figure 11B:
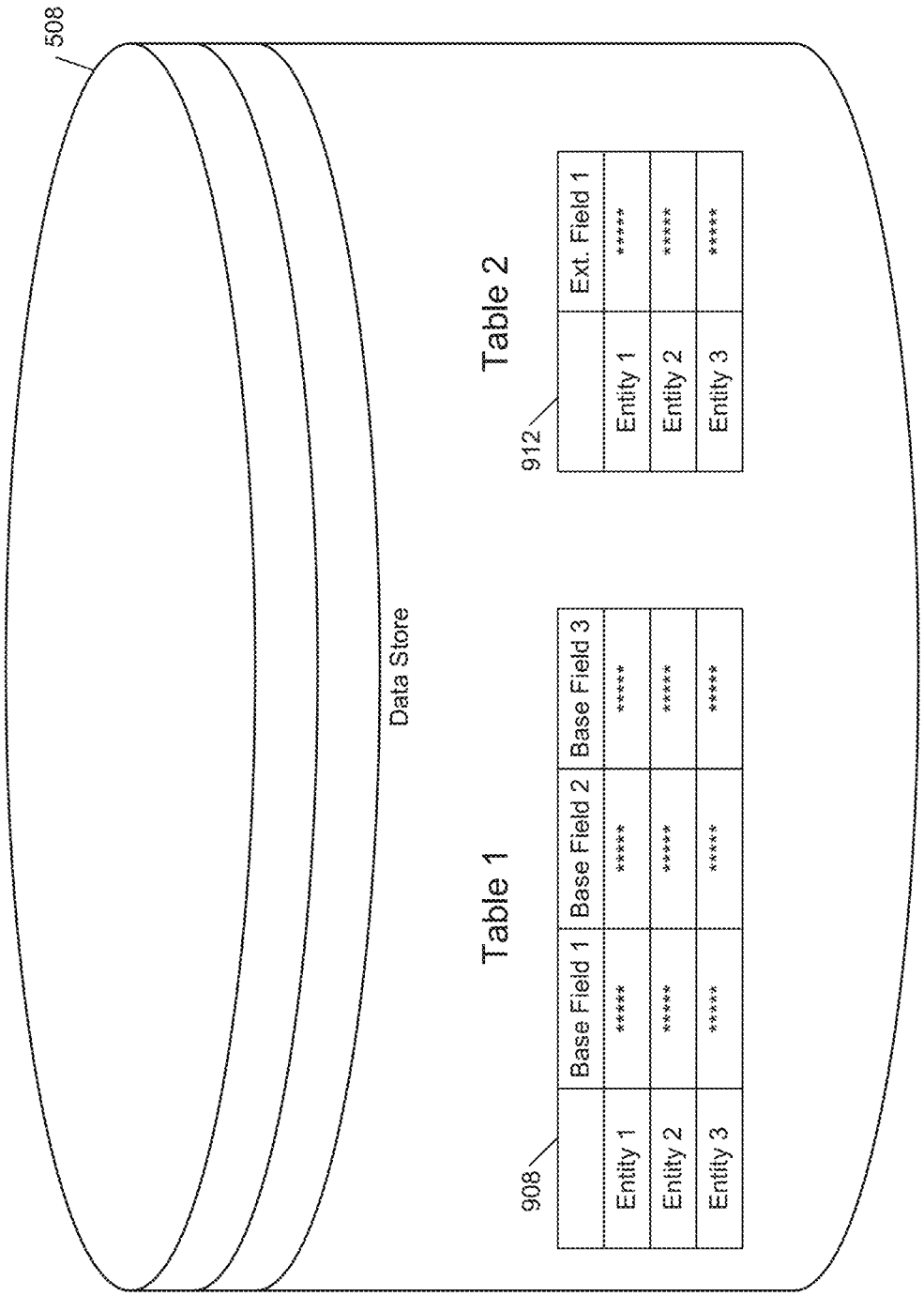
FIG. 11B is a simplified graphical representation of extension fields being stored in a different table.

In FIG. 11B, another example of the data store 508 includes a first table 908 and a second table 912. The first table 908 includes data for the common fields while the second table 912 includes data for the extension fields. In various implementations, the tables may be part of the same schema in a single relational database. In order to provide an extended data object for entity 1, the three base fields are read from the first table 908 and the first extension field is read from the second table 912.

Figure 11C:
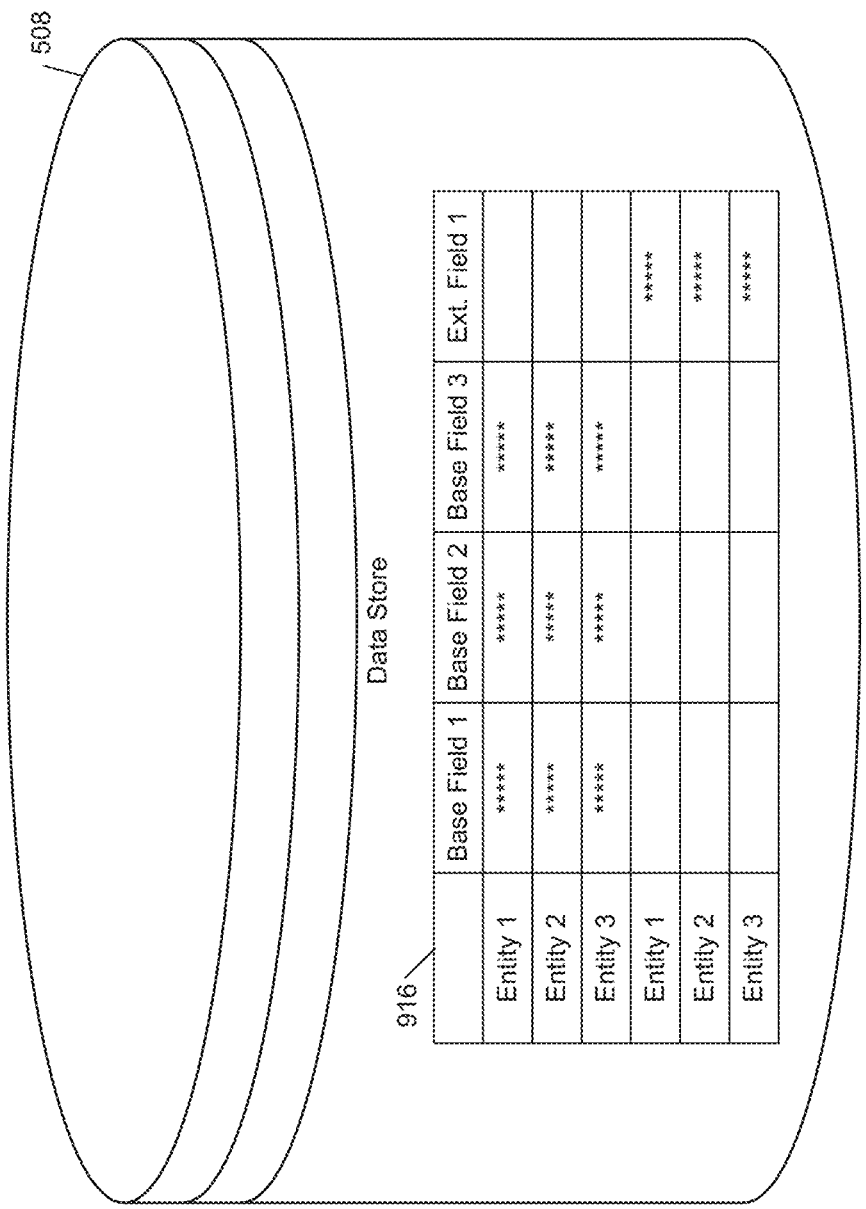
FIG. 11C is a simplified graphical illustration of extension fields being stored in different records of a table.

In FIG. 11C, an example of the data store 508 includes a single table 916. In this example, the table 916 includes fields for the base fields as well as a field for the extension field. However, the extension fields are present for different records than are the base fields. To construct an extended data object for entity 1, the record for entity 1 having base field values would be combined with the record for entity 1 having the extension field value.

Figure 11D:
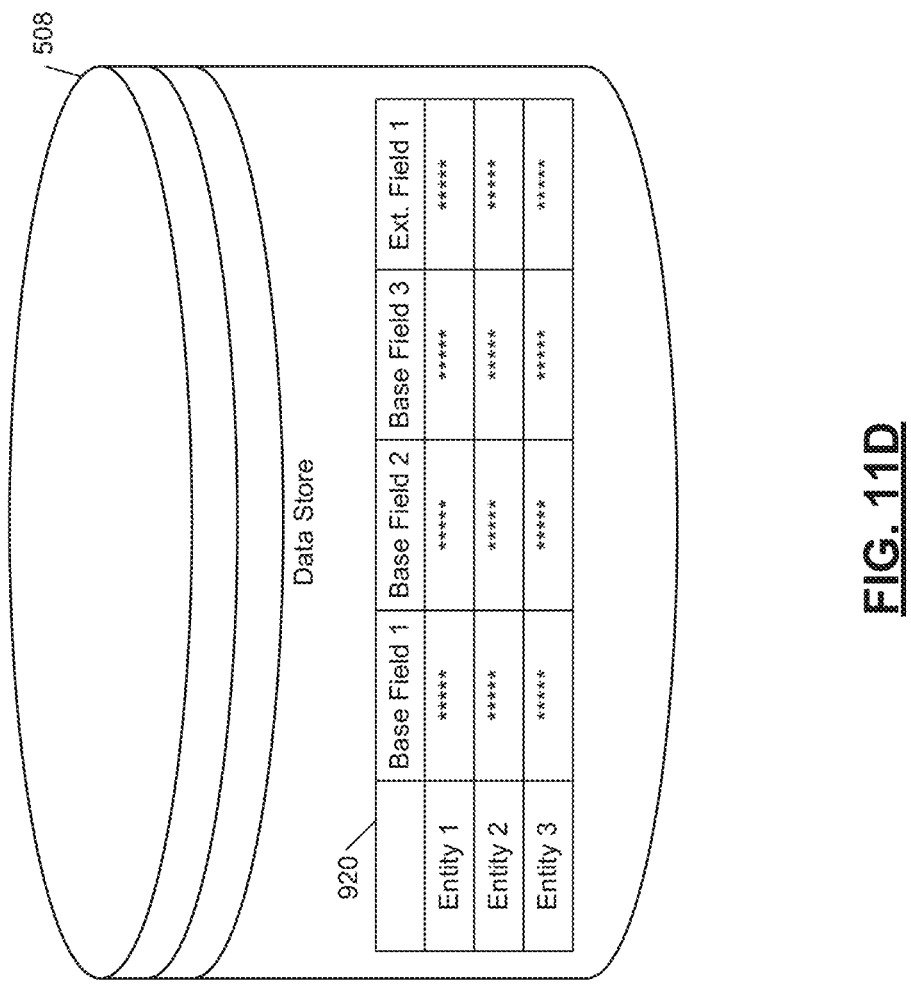
FIG. 11D is a simplified graphical illustration of extension fields being stored in the same records in a table of a data store.

In FIG. 11D, an example data store 508 includes a table 920. The table 920 includes the same fields as the table of 916 but each record is self-contained. In other words, only a single record of the table 920 needs to be accessed to construct an extended data object for entity one.

Some combination of the implementations of FIGS. 11A-11D may be used. For example, some entities may have extension values present in a single record with the base values, while other entities may be spread across multiple records. In another example, some extension values may be present in the same records as the base field values while other extension values are present in different records. As yet another example, some extension values may be present in the same records as the base field values while other extension values are present in other tables or data stores altogether.

In such implementations, queries may return different numbers of records depending on which entity is being queried. When separate records are used, joins may be required on reads and splits may be required on writes. With consolidated records, joining and splitting may be avoided, but it may be more difficult to support tenant-specific indexing requirements. Further, different tenants may have different requirements for data storage, such as encryption, physical location, power redundancy, etc. This may drive how the data store 508 is configured. In other words, the principles of the present disclosure are relevant regardless of the implementation details of how base and extension data is stored.

Figure 12:
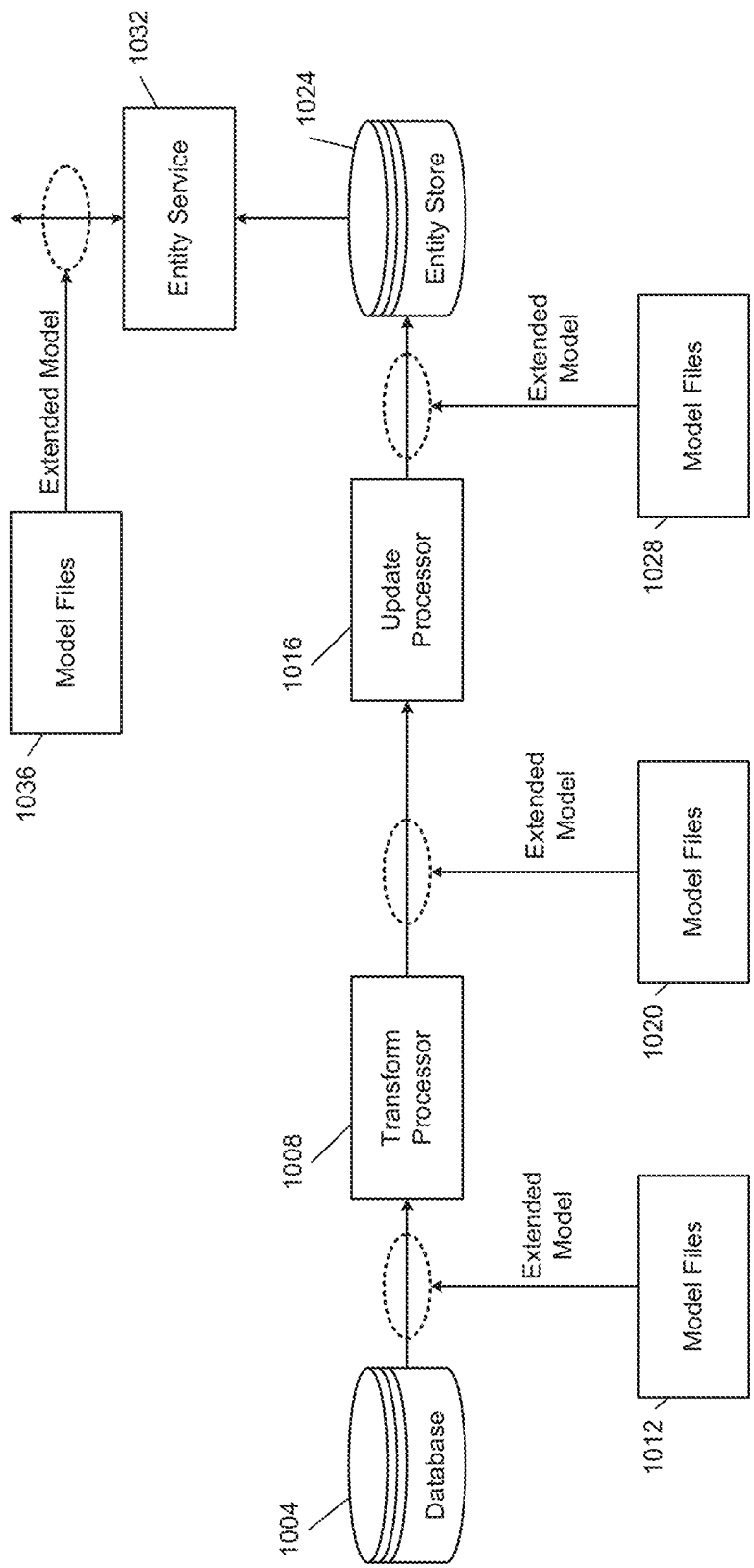
FIG. 12 is a functional block diagram of an example data pipeline implementing the principles of the present disclosure.

In FIG. 12, a graphical example of a data pipeline is presented simply for illustration of how extended models can be used in an entire data pipeline. A legacy database 1004 provides data to a transform processor 1008. The data is provided according to an extended model defined by model files 1012. The transform processor 1008 may transform data from one representation to another, such as changing dates from month-day-year into year-month-day Data from the transform processor 1008 is provided to an update processor 1016 in a form specified by model files 1020. The update processor 1016 may update data and store that data in an entity store 1024 according to a model defined by model files 1028. As one example, the update processor 1016 may retrieve new address information for an entity, such as a patient, from an address database.

An entity service 1032 may service requests for entities stored within the entity store 1024 using data objects according to an extended model defined by model files 1036. In various implementations, the models, extensions, and extension bindings in the model files 1012, 1020, 1028, and 1036 may be the same, may have some differences, or may be completely independent.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Various embodiments of the present disclosure provide systems and processes to receive a query from a requestor in various formats, convert these multiple formats to a single programmatic representation to bind data extensions to the query, and thereafter convert the bound data extensions to any of the plurality of query formats. In an example, the query is directed to a first data model with the first data model specifying a plurality of base data fields. A set of extension bindings for the first data model are determined based on the query and the query execution context, where the context includes, but is not limited to, an identifier of the tenant issuing the query. Each binding of the set of extension bindings can operate to specify an extension to the first data model from a plurality of model extensions and to specify one of the plurality of base data fields of the first data model as a node at which the extension is added. Each extension of the plurality of model extensions can specify a non-empty set of data fields. The process can then retrieve, from data storage: base data values according to the plurality of base data fields of the first data model and extension data values according to, for each binding of the set of extension bindings, the non-empty set of data fields from the specified extension. The process can generate a data object from the base data values and the extension data values according to an extended data model, wherein the extended data model is defined by the first data model extended by, for each binding of the set of extension bindings, adding the non-empty set of data fields from the specified extension to the first data model at the specified node. The process can then return the data object to the requestor in any of the many types of queries.

The invention claimed is:

1. A query processing method comprising:
receiving a query from a requestor, wherein the query is directed to a first data model that specifies a set of base data fields;
determining a set of extension bindings for the first data model using the query, wherein:
a binding of the set of extension bindings specifies an extension, which specifies a non-empty set of data fields, to the first data model from a plurality of model extensions and specifies one of the set of base data fields of the first data model as a node at which the specified extension is added; and
retrieving, from data storage:
base data values according to the set of base data fields of the first data model; and
extension data values according to, for a first binding of the set of extension bindings, the non-empty set of data fields from the extension specified by the first binding; and
generating a data object from the base data values and the extension data values according to a second data model,
wherein the second data model is based on the first data model extended by adding the non-empty set of data fields from the extension specified by the first binding to the first data model at the node specified by the first binding.

2. The query processing method of claim 1 further comprising returning the data object to the requestor.

3. The query processing method of claim 1 wherein each binding of the set of extension bindings specifies a respective extension to the first data model from the plurality of model extensions and specifies a respective one of the set of base data fields of the first data model as a node at which the specified extension is added.

4. The query processing method of claim 1 wherein each extension of the plurality of model extensions specifies a respective non-empty set of data fields.

5. The query processing method of claim 1 wherein the retrieving includes retrieving extension data values according to, for each binding of the set of extension bindings, the non-empty set of data fields from the extension specified by the binding.

6. The query processing method of claim 1 wherein the second data model is generated from the first data model by, for each binding of the set of extension bindings, adding the non-empty set of data fields from the extension specified by the binding to the first data model at the node specified by the binding.

7. The query processing method of claim 1 further comprising:
determining an associated tenant of a plurality of tenants, wherein the set of extension bindings is determined based on an identity of the associated tenant.

8. The query processing method of claim 7 wherein determining the associated tenant is based on an identity of the requestor.

9. The query processing method of claim 1 wherein:
a mapping associates a plurality of tenants with a plurality of extension bindings that is a superset of the set of extension bindings; and
determining the set of extension bindings includes:
based on the mapping, identifying a first tenant of the plurality of tenants associated with the requestor; and
selecting, as the set of extension bindings, ones of the plurality of extension bindings that are associated with the first tenant.

10. The query processing method of claim 1 wherein the extension specified by the first binding specifies data types for the non-empty set of data fields.

11. A non-transitory computer-readable medium comprising instructions including:
receiving a query from a requestor, wherein the query is directed to a first data model that specifies a set of base data fields;
determining a set of extension bindings for the first data model using the query, wherein:
a binding of the set of extension bindings specifies an extension, which specifies a non-empty set of data fields, to the first data model from a plurality of model extensions and specifies one of the set of base data fields of the first data model as a node at which the specified extension is added; and retrieving, from data storage:
  base data values according to the set of base data fields of the first data model; and
  extension data values according to, for a first binding of the set of extension bindings, the non-empty set of data fields from the extension specified by the first binding; and generating a data object from the base data values and the extension data values according to a second data model, wherein the second data model is based on the first data model extended by adding the non-empty set of data fields from the extension specified by the first binding to the first data model at the node specified by the first binding.

12. The computer-readable medium of claim 11 wherein each binding of the set of extension bindings specifies a respective extension to the first data model from the plurality of model extensions and specifies a respective one of the set of base data fields of the first data model as a node at which the specified extension is added.

13. The computer-readable medium of claim 11 wherein the retrieving includes retrieving extension data values according to, for each binding of the set of extension bindings, the non-empty set of data fields from the extension specified by the binding.

14. The computer-readable medium of claim 11 wherein the second data model is generated from the first data model by, for each binding of the set of extension bindings, adding the non-empty set of data fields from the extension specified by the binding to the first data model at the node specified by the binding.

15. The computer-readable medium of claim 11 wherein:
  a mapping associates a plurality of tenants with a plurality of extension bindings that is a superset of the set of extension bindings; and
  determining the set of extension bindings includes:
    based on the mapping, identifying a first tenant of the plurality of tenants associated with the requestor; and
    selecting, as the set of extension bindings, ones of the plurality of extension bindings that are associated with the first tenant.

16. A system comprising:
memory hardware configured to store instructions; and
processor hardware configured to execute the instructions, wherein the instructions include:
  receiving a query from a requestor, wherein the query is directed to a first data model that specifies a set of base data fields;
  determining a set of extension bindings for the first data model using the query, wherein:
    a binding of the set of extension bindings specifies an extension, which specifies a non-empty set of data fields, to the first data model from a plurality of model extensions and specifies one of the set of base data fields of the first data model as a node at which the specified extension is added; and
  retrieving, from data storage:
    base data values according to the set of base data fields of the first data model; and
    extension data values according to, for a first binding of the set of extension bindings, the non-empty set of data fields from the extension specified by the first binding; and
  generating a data object from the base data values and the extension data values according to a second data model,
  wherein the second data model is based on the first data model extended by adding the non-empty set of data fields from the extension specified by the first binding to the first data model at the node specified by the first binding.

17. The system of claim 16 wherein each binding of the set of extension bindings specifies a respective extension to the first data model from the plurality of model extensions and specifies a respective one of the set of base data fields of the first data model as a node at which the specified extension is added.

18. The system of claim 16 wherein the retrieving includes retrieving extension data values according to, for each binding of the set of extension bindings, the non-empty set of data fields from the extension specified by the binding.

19. The system of claim 16 wherein the second data model is generated from the first data model by, for each binding of the set of extension bindings, adding the non-empty set of data fields from the extension specified by the binding to the first data model at the node specified by the binding.

20. The system of claim 16 wherein:
a mapping associates a plurality of tenants with a plurality of extension bindings that is a superset of the set of extension bindings; and
determining the set of extension bindings includes:
  based on the mapping, identifying a first tenant of the plurality of tenants associated with the requestor; and
  selecting, as the set of extension bindings, ones of the plurality of extension bindings that are associated with the first tenant.

* * * * *